R. S. BOLGER.
EXERCISING COUCH.
APPLICATION FILED MAR. 11, 1915.

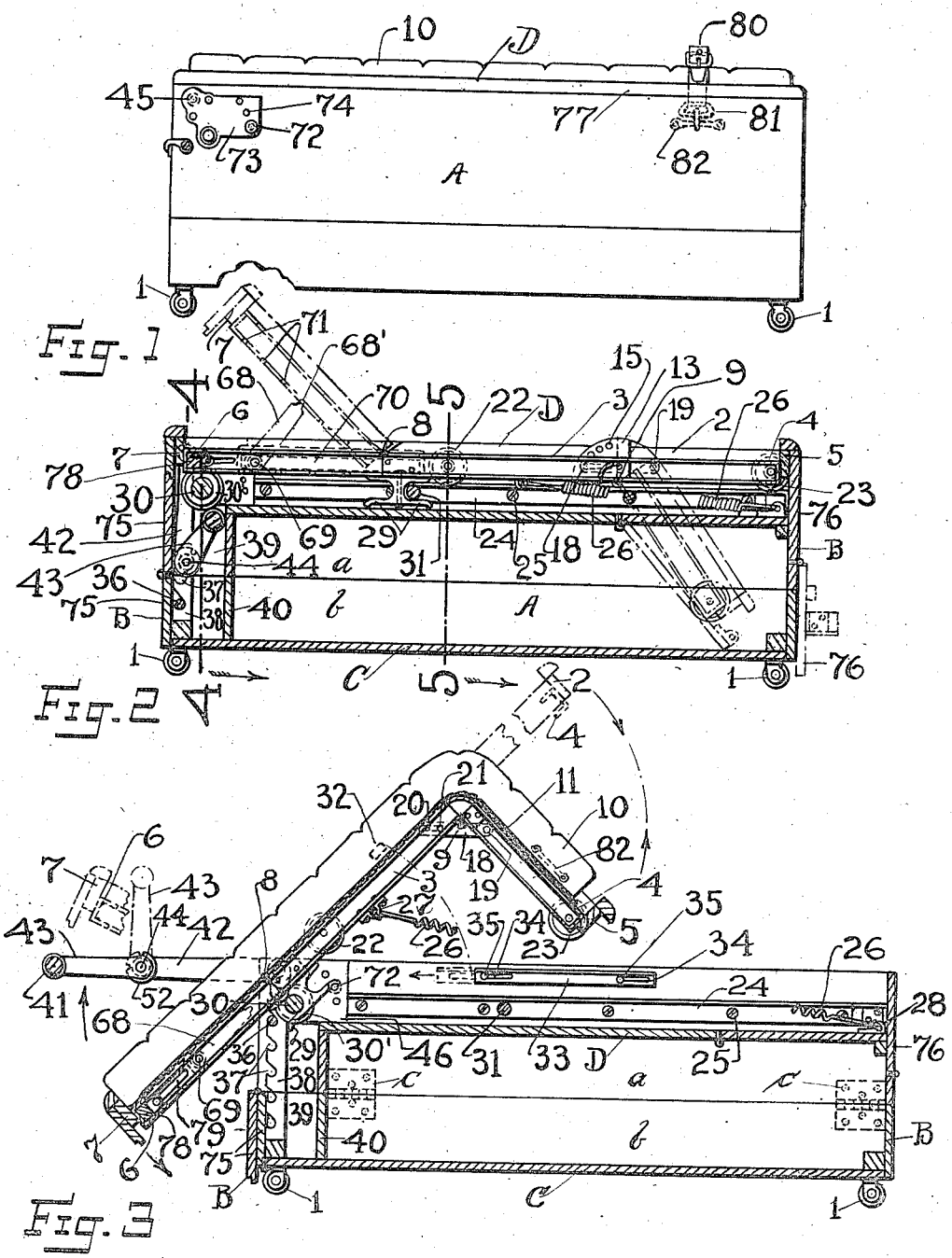

1,158,779.

Patented Nov. 2, 1915.
5 SHEETS—SHEET 2.

Witnesses:
Bernard F. McCabe.
Jesse D. Walker

Inventor
Robert S. Bolger
By Hefford M. Smith
Attorney

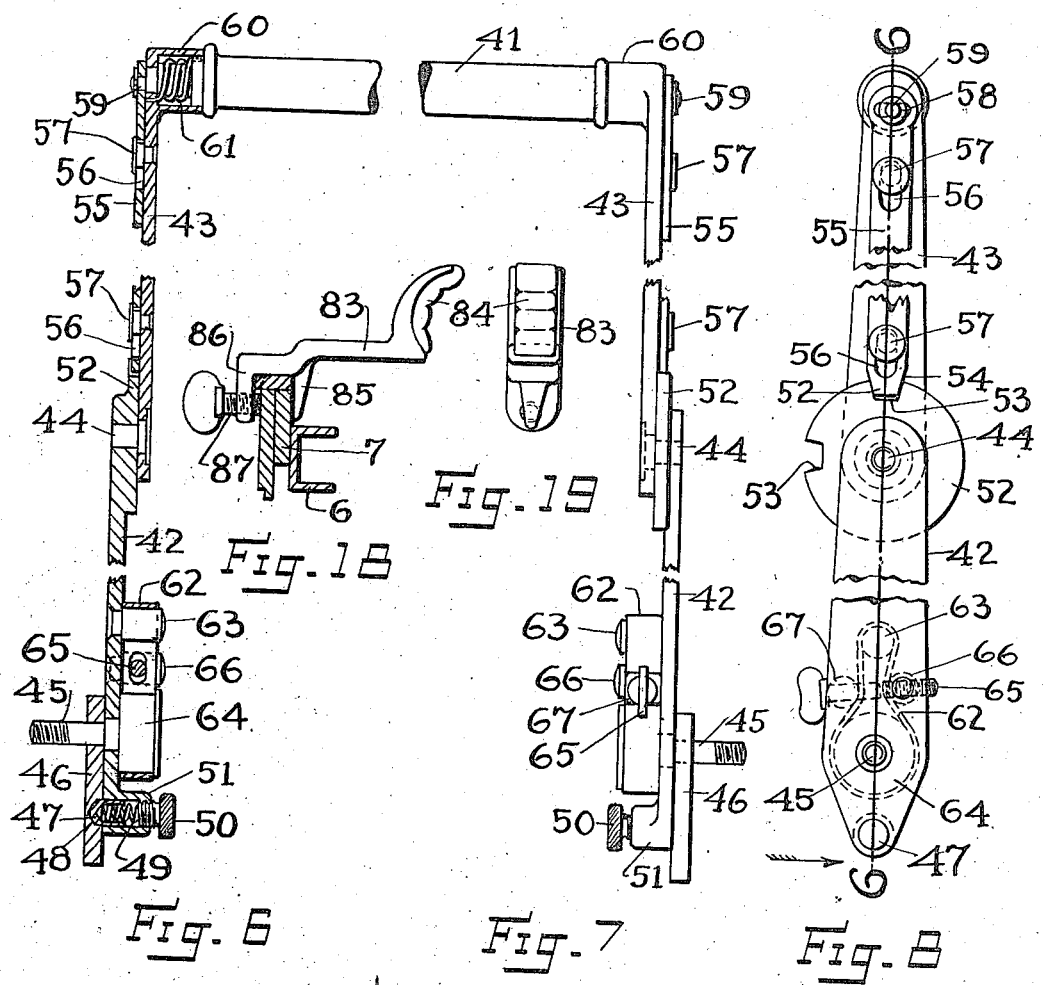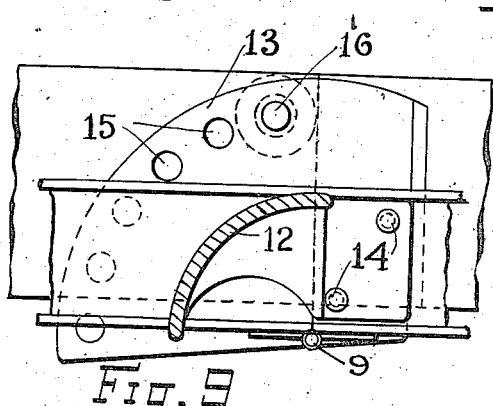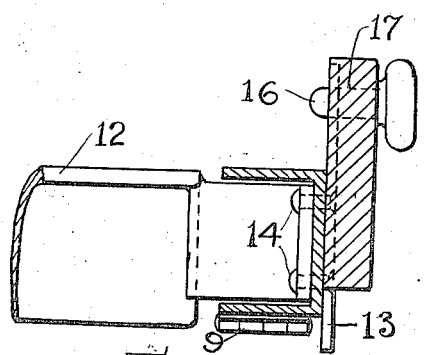

R. S. BOLGER.
EXERCISING COUCH.
APPLICATION FILED MAR. 11, 1915.

1,158,779.

Patented Nov. 2, 1915.
5 SHEETS—SHEET 4.

Witnesses
Bernard F. McCabe.
Jesse D. Walker.

Inventor
Robert S. Bolger
By Rexford M. Smith
Attorney

UNITED STATES PATENT OFFICE.

ROBERT S. BOLGER, OF RICHMOND HILL, NEW YORK, ASSIGNOR OF ONE-HALF TO BERNARD F. McCABE, OF RICHMOND HILL, NEW YORK.

EXERCISING-COUCH.

1,158,779.  Specification of Letters Patent.  Patented Nov. 2, 1915.

Application filed March 11, 1915. Serial No. 13,825.

*To all whom it may concern:*

Be it known that I, ROBERT S. BOLGER, a citizen of the United States, residing at Richmond Hill, in the county of Queens and State of New York, have invented new and useful Improvements in Exercising-Couches, of which the following is a specification.

This invention relates to an exercising couch, the broad object of the invention being to produce exercising apparatus closely resembling in one adjustment of the mechanism thereof, an ordinary box couch containing and concealing the mechanism which is embodied therein in such a way that a portion of the mechanism may be withdrawn from the inclosing frame or body of the couch to enable the occupant to utilize the apparatus as will hereinafter appear.

The invention has for its object to produce a combined couch and exercising apparatus which may be used for therapeutical purposes, as for the treatment of various ailments of the human body when it is found beneficial to incline the body of the patient at an inverted angle or, in other words, with the head lowered and the feet raised; to provide a couch which may be used as an exercising device while the body is in a horizontal position; to provide a tilting body support which may be tilted to any desired angle required by the occupant or the physician; to provide for the automatic return of the body support to a horizontal position from an inclined position upon relaxation on the part of the occupant; to provide a body support wherein the head section may be raised or lowered so that the desired angle may be obtained for the upper portion of the human body; to provide a couch wherein the foot section may be raised or lowered to any desired angle; to provide a body support whereon the weight of the occupant while in an inverted position may be partly or wholly supported by the foot section of the body support.

With the above and other objects in view, the invention consists in the novel construction, combination and arrangement of parts, as herein described, illustrated and claimed.

Figure 4:
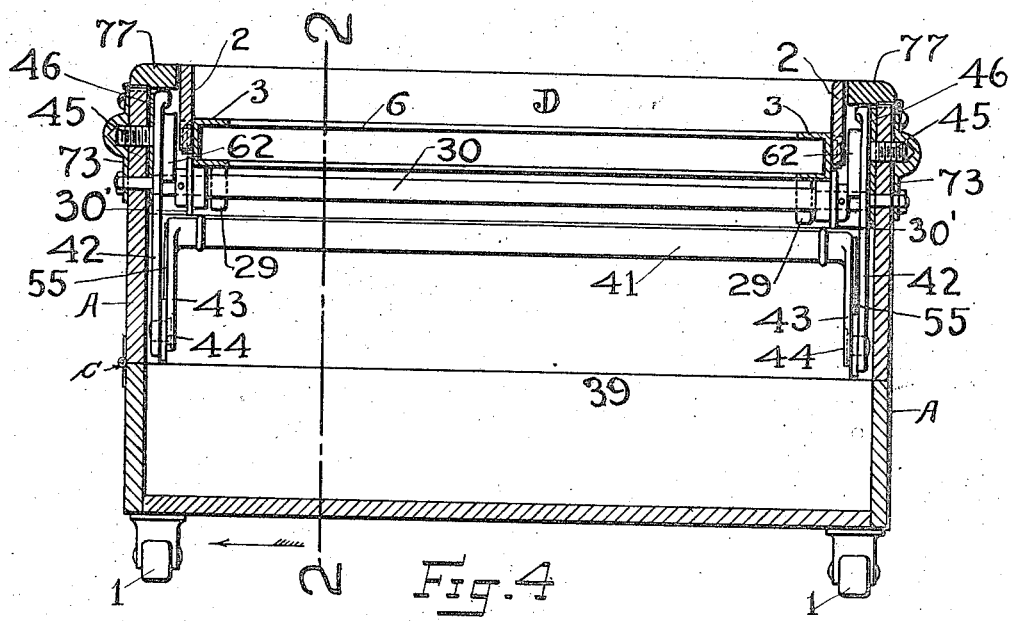
Figure 5:
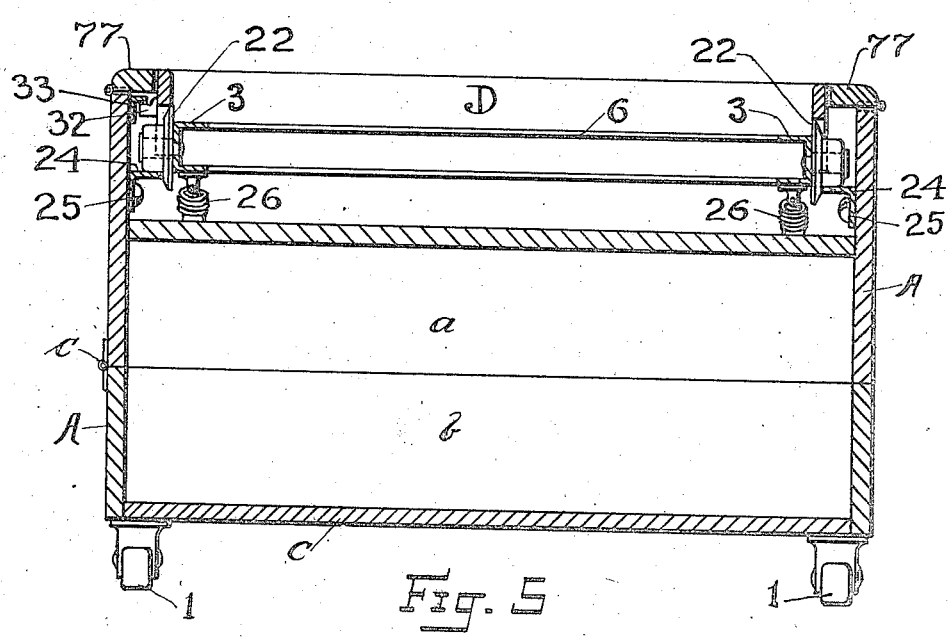
Figure 11:
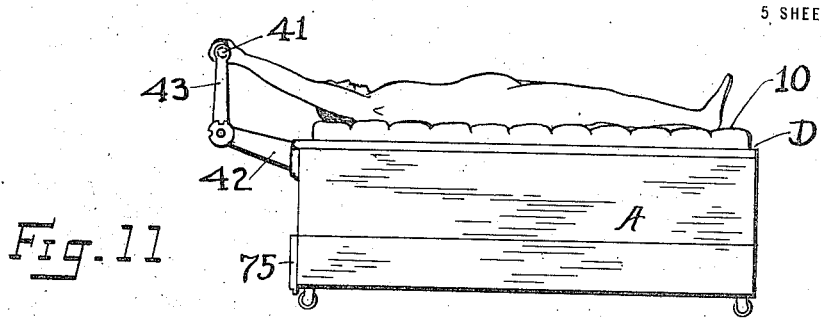
Figure 12:
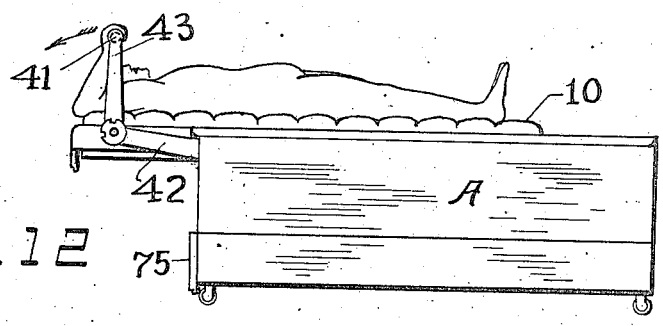
Figure 13:
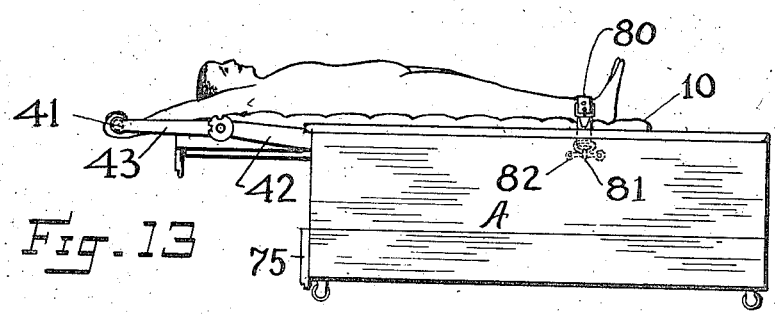
Figure 14:
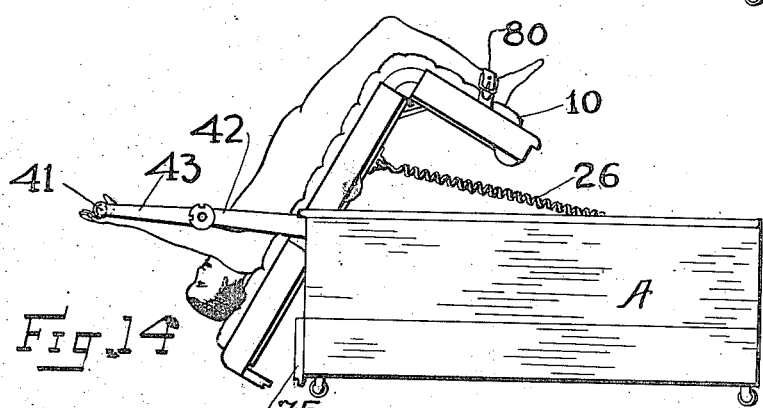
Figure 15:
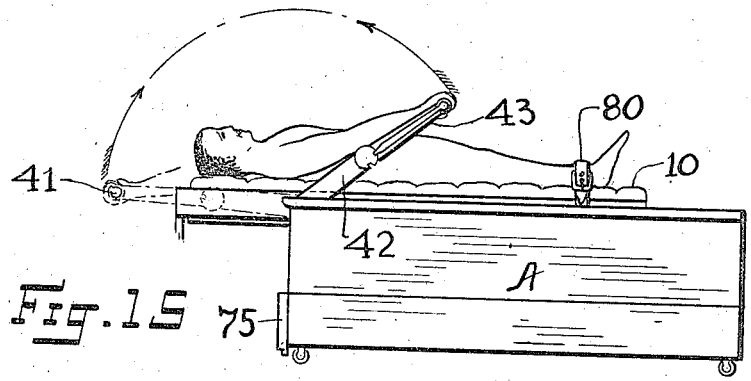
Figure 16:
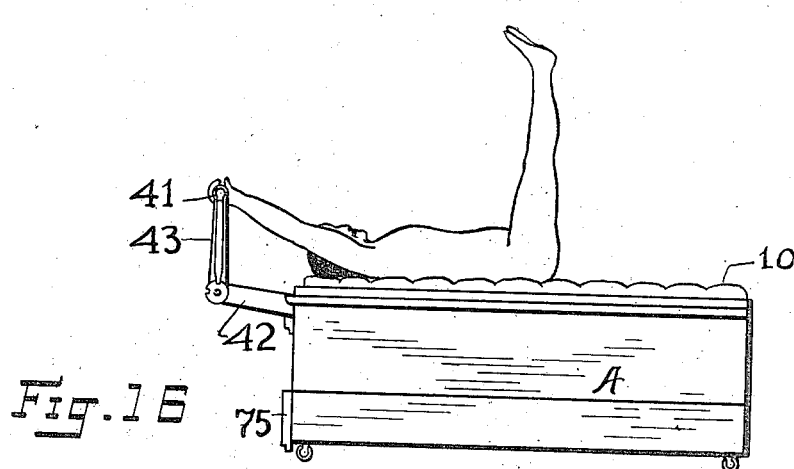
Figure 17:
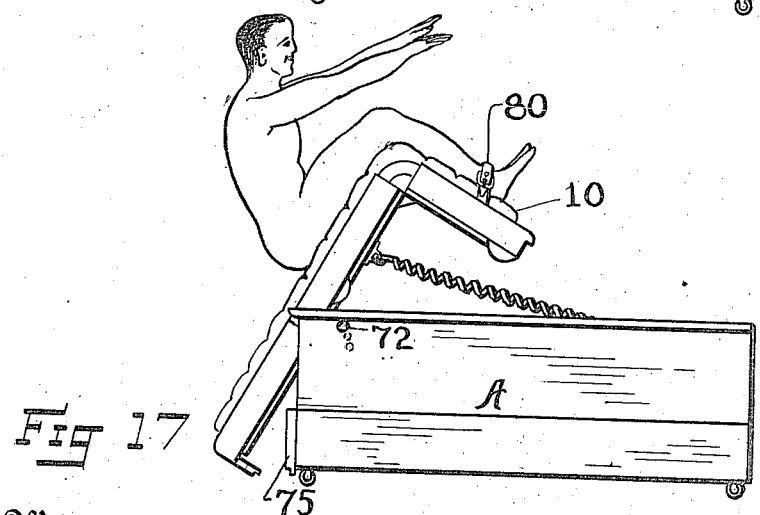

In the accompanying drawings:—Figure 1 is a side elevation of the exercising couch of this invention. Fig. 2 is a vertical longitudinal section on the line 2—2 of Fig. 4 looking in the direction of the arrow, and indicating by dotted lines the angular adjustment of the head and foot sections of the body support. Fig. 3 is a vertical longitudinal section on the same line as Fig. 2 showing the body support inclined and the foot section thereof swung downwardly. Fig. 4 is an enlarged cross section on the line 4—4 of Fig. 2 looking in the direction of the arrow. Fig. 5 is a similar section on the line 5—5 of Fig. 2 looking in the direction of the arrow. Fig. 6 is a vertical cross section taken on the line 6—6 of Fig. 8 looking in the direction of the arrow. Fig. 7 is an edge view of one of the arms shown in Fig. 8. Fig. 8 is a side elevation of one of the arms shown in Figs. 6 and 7. Fig. 9 is an enlarged fragmentary section illustrating the hinged foot section of the body support and the means for adjusting the same. Fig. 10 is a fragmentary section taken at right angles to Fig. 9. Fig. 11 is a side elevation showing the handle bar arms withdrawn from the frame of the couch with the handle bar elevated to be grasped by the hands of the occupant. Fig. 12 is a similar view showing the body support after it has been slid outwardly by the operator pulling on the cross bar. Fig. 13 is a similar view showing the jointed sections of the cross bar arms substantially in longitudinal alinement with each other. Fig. 14 is a side elevation of the couch showing the body support tilted by the operator to an inclined position. Fig. 15 is a side elevation of the device showing the method of using the handle bar as an exercising device for the arms and chest. Fig. 16 is a similar view showing the method of using the apparatus for leg exercises. Fig. 17 is a side elevation of the couch showing one of the positions thereof for developing the hips and abdominal muscles. Fig. 18 is a fragmentary section showing in elevation one of the body holding members for the patient or occupant. Fig. 19 is a face view of said body holding member.

Referring primarily to Figs. 1 to 5 inclusive, the exercising apparatus is shown in the form of a box couch, the same comprising the sides A, the ends B, the bottom C and a body support D which forms a closure for the top of the box-like body or frame formed by the parts A, B and C just above referred to. In the preferred embodiment of the invention, the box or frame is mounted upon casters 1 and the box-like frame is divided between the top and bottom thereof into an upper section *a* and a lower section *b*, said sections being hinged together at *c* thereby enabling the upper section of the frame to be raised and lowered to provide for the use of the lower part of the box-like frame for storage purposes.

The body supporting member D, in the preferred embodiment of the invention, comprises a substantially rectangular frame 2 which by the means hereinafter described is slidable lengthwise of the main frame. Channel bars 3 are fixedly secured to the inner faces of the sides of the frame 2, a transversely extending channel bar 4 being fastened to the end cross piece 5 of the slidable frame and another transverse channel bar 6 being secured to the head cross piece 7 of the slidable frame or body support.

The sides of the slidable frame 2 and the channel bars 3 secured to said sides are divided and hinged together at 8 and 9 for the purpose of permitting the head section of the body support to be swung upwardly as indicated by dotted lines in Fig. 2 to support the back and head of the patient or occupant, and to permit the foot section to swing downwardly as indicated by full lines in Fig. 3 and dotted lines in Fig. 2 to permit the legs of the occupant to bend at the knee joints.

10 designates a mattress which is supported by a flexible spring 11 marginally fastened to the upper flanges of the channel bars 3, 4 and 6.

Referring now to Figs. 9 and 10 in connection with Figs. 2 and 3, 12 designates a mattress spring guard which is arcuate or quadrant shaped in cross section and provided at its opposite ends with quadrant shaped flanges 13 which form end shields for the mattress. The guard 12 is fastened in fixed relation to the foot section of the body support by bolts or rivets 14 or their equivalent and the flanges 13 are provided with arcuate series of holes 15 to receive locking pins 16 insertible through other holes 17 in the sides of the body support as shown in Fig. 9. By this means the foot section of the body support may be adjusted to any desired angle in relation to the remainder of the body support and locked by said pins 16. When the pins 16 are removed and not used, the hinged foot section of the body support is limited in its movement on the hinge 9 by means of corner links 18 pivotally connected at 19 to one section of the body support and formed with longitudinal slots 20 to engage pins 21 on the adjoining section. This allows the foot section of the body support to automatically swing from the normally horizontal position of Fig. 2 to the substantially right angular position shown in Fig. 3.

The body support is provided with rollers 22 and 23 which travel upon supporting rails 24 preferably of angle iron as shown in Fig. 5 and secured by suitable fasteners 25 to the sides of the frame or box of the couch. A retracting spring 26 is attached at one end to the intermediate section of the body support at the point 27 and attached at its opposite end at 28 to a fixed point on the main frame or box, said spring serving to return the body support to its normally horizontal position, in the event of the patient or occupant relaxing his hold upon the handle bar hereinafter particularly described.

Fastened to the under sides of the channel bars 3 are oppositely located fulcrum hooks 29 the operation of which is best illustrated in Figs. 2 and 3. At the head end of the couch there is a cross rod or shaft 30 on which are the rolls 30'. The shaft 30 is adapted to be engaged by the hooks 29 when the body support is slid outwardly and before it is tilted to the position shown in Fig. 3, said hooks and cross rod serving to uphold the body support when inclined. At the inner limit of its sliding movement the hooks 29 engage another cross rod or shaft 31 while lugs or projections 32 on the inner faces of the sides of the slidable frame 2 pass under longitudinally slidable stops 33 preferably of angle iron as indicated in Fig. 3, said stops being formed with longitudinal slots 34 through which are inserted headed studs or pins 35 carried by the side frame A. When the stops 33 are in the position shown in Fig. 3, the lugs 32 do not engage said stops and therefore the body support may be tilted to the inclined position of Fig. 3. When, however, the stops 34 are moved to the left in Fig. 3, the lugs 32 are held under the overhanging upper portions or flanges of the stops which thereby prevent any tilting movement of the body support. As the body support is drawn outwardly to the position shown in Fig. 3, the rollers 22 and 23 travel along the rails 24 until said body support is tilted whereupon the rollers 23 leave said track rails, permitting the foot section of the body support to swing downwardly to the extent limited by the links 18.

The tilting movement of the body support is limited by means of a shiftable rod 36 the opposite ends of which may be placed in vertical series of notches 37 in a pair of rack bars 38 which are arranged in a compartment 39 within one end of a box or frame as shown in Figs. 2 and 3, said compartment 39 being divided from the storage compartment of the couch by means of a partition 40. Foldable within the said compartment 39 are the controlling means by which the occupant manipulates the body support to assume a horizontal position or various inclined positions. The operating means are best illustrated in Figs. 6, 7 and 8 taken in connection with Figs. 11 to 17 inclusive, the same comprising a handle bar 41, and handle bar supporting arms each comprising an inner section 42 and an outer section 43, said sections having a jointed or pivotal connection at 44 whereby they may be thrown into line with each other or at an angle to each other. The arms are pivotally connected at their inner ends to the frame or box of the couch by means of bolts or studs 45 which pass through stationary plates 46 within the box or frame, the inner sections 42 of the arms being extended beyond the pivots 45 to receive locking pins 47 one of which is best illustrated in Fig. 6, each pin 47 being adapted to engage a notch or recess 48 in the adjacent plate 46. The pin 47 is centrally and longitudinally bored to receive a spring 49 the tension of which is adjustable by means of a screw 50 which is threaded into a tubular boss or sleeve 51 on the inner extremity of the adjacent handle bar supporting arm. The locking pins 47 are provided for the purpose of locking the inner sections 42 of the handle bar arms in fixed relation to the frame or box of the couch.

Each of the inner sections 42 carries at its outer end a disk-shaped extension 52 having a plurality of notches 53 to be engaged by the tapered extremity 54 of a latch 55 provided with slots 56 receiving guide pins or studs 57 on the outer section 43 of each handle bar arm. Each latch 55 is provided near its outer end with a transversely extending slot 58 which receives an eccentric pin 59 projecting from the extremities of the handle bar 41 hereinabove referred to. The opposite end portions of the handle bar 41 are mounted to turn within tubular bearing extensions 60 on the outer sections 43 of the arms as best illustrated in Fig. 6. Springs 61 encircle and are fast to the end portions of the handle bar 41, one end of each spring being fixedly connected to the adjacent section 43 of the handle bar arm. Normally the springs 61 serve to hold the latches 55 in engagement with the notches 53 but by gripping and turning the handle bar 41, the occupant of the couch may withdraw the latches 55 from the notches 53 thereby permitting the sections 43 to be moved upwardly or downwardly in relation to the sections 42 in order to obtain results illustrated in Figs. 11 to 13 inclusive.

In connection with each handle bar arm I employ a friction brake consisting of a friction strap 62 preferably endless as indicated in Fig. 8 and passing around a stud 63 on the inner section 42 of the adjacent handle bar arm and also around a larger stud or fixed cylindrical projection 64 bearing a fixed relation to the adjacent side of the box or couch to which it is secured by means of the pivot or bolt 45. Between the parts 63 and 64, I employ tensioning means for the friction strap, the same being shown as comprising a tensioning screw 65 having a threaded connection with a stud 66 on the arm section 42, said screw passing through a presser bar 67 which bears against the friction strap, so that by turning the screw 65 in one direction or the other, the strap 62 may be loosened or tightened to provide greater or less resistance to the movement of the handle bar 41 and its supporting arms when the device is used for exercising the arms and chest as shown in Fig. 15. When the handle bar and its supporting arms are not in use they may be folded within the lines of the frame or box and into the compartment 39 as indicated in Fig. 2.

Braces 68 having reduced ends 68' and pivotally attached at 69 to the plate 70 which is rigidly fastened to the center section of the frame 3 are adapted to engage series of holes 71 on the under side of the head section of the body support as indicated by dotted lines in Fig. 2, to sustain said section at any desired angle for the convenience or comfort of the occupant. If it is desired to lock the body support in any one of its inclined positions, this may be done by locking pins 72 insertible through bearing plates 73 on the outside of the box or frame as shown in Fig. 1, a plurality of holes 74 being provided for the locking pins 72, said pins projecting sufficiently within the frame or box to engage the fulcrum hooks 29 in the manner illustrated in Fig. 3. At one end the frame or box is provided with a hinged door 75 adapted to fold downwardly as shown in Fig. 3 to allow for the operation of the apparatus, another hinged door 76 being provided at the foot of the frame or couch to give access to the mechanism. Longitudinally extending flaps or filler rails 77 (see Fig. 4) are provided to close in the spaces at the sides of the slidable frame 2, said flaps being swung outwardly to operate the slidable frame and body support.

78 designates a heavy bar or weight having at its opposite ends pintles which are slidable in slots 79 extending longitudinally of the body support thereby enabling the weight 78 to be shifted lengthwise of the body support in order to give the desired balance to the latter in accordance with the weight of the occupant and other conditions.

In order to hold the body of the occupant on the body support when in an inclined position or during certain exercises, I provide what I term a foot strap 80 having an adjusting buckle as shown in Figs. 1, 13 and 15 and adapted to be connected by snap hooks 81 at its ends to keepers 82 at opposite sides of the body support. I also provide other body holding members 83 as shown in Figs. 18 and 19, the same being padded or upholstered as shown at 84 to prevent chafing the body of the occupant and each being bifurcated to form a clamping arm 85 adapted to bear against the inner surface of the adjacent head bar 7 of the slidable frame 2, and another arm 86 which receives a binding or clamping screw 87 engaging the slidable frame to hold the body holding member in position and enable the same to be adjusted transversely of the body support so as to engage the body, for example, at the shoulders.

When used as a therapeutical device and operated by the patient or occupant, the hinged flaps 77 are swung outwardly on their hinges and the end doors 75 and 76 are let down on their hinges. The handle bar and its supporting arms are then drawn outwardly and locked by the means hereinabove described. The outer sections 43 of the arms may then be swung upwardly to the position shown in Figs. 11 and 12 and the limiting rod 36 placed at any desired position to limit the tilting movement of the body support. The patient now lies on his back on the mattress 10 and places both feet under the strap 80 then reaches above his head and grasps the handle bar 41 and by exerting a slight pull on said handle bar, the body support moves outwardly with minimum friction on account of the rollers 22 and 23 moving along the track rails 24. Then by slightly turning the handle bar and overcoming the tension of the springs 61, the outer sections 43 of the arms are unlatched from the inner sections 42 thereof enabling the occupant to move the arms to the position indicated in Fig. 13, the body support being then in a position where the weight on the foot end thereof is only slightly in excess of the weight on the head end thereof. Then a slight upward pressure of the hands on the handle bar causes the head end of the frame to tilt downwardly until it is arrested by the limiting rod 36, the fulcrum hooks 29 having in the meantime engaged the cross rod or shaft 30. The intermediate section of the body support swings upwardly as shown in Fig. 3 and the hinged foot section rides along on the rollers 23 until the limiting links 18 prevent further swinging movement of the foot section, whereupon the rollers 23 leave the tracks and the body support assumes the shape illustrated in Fig. 14. The body support and patient will retain this inverted position as long as the patient keeps the pressure on the handle bar, but if for any reason the hands should drop or be removed from the handle bar or the patient relax his muscles, the spring or springs 26 will restore the body support to its normal or substantially horizontal position, the rollers 23 resting and moving along the track rails 24 until such normal position of the body support is obtained, the springs 26 serving to slide the body support to its final normal psition as shown in Fig. 11.

Where it is desired to have some other person than the patient operate the apparatus, the handle bar and its supporting arms need not be removed from the compartment 39, the operator placing the patient on the body support and adjusting the strap 80. After dropping the end section or door 75, the operator then pushes the body support outwardly and by pressing downwardly on the head section thereof swings the same into the required angular position, locking it there by means of the pins 72.

When used for either comfort or curative purposes, the head section may be elevated to the desired angle as indicated by dotted lines in Fig. 2 and sustained by the braces 68 and in like manner the foot section of the body support may be lowered to any desired angle and locked by means of the pins 16. The means last referred to may also be used to prevent the foot and intermediate sections of the body support from assuming an angular relation and causing the bending of the knees of the patient when the frame is tilted to an inclined position. The guard 12 supports the mattress spring when the foot and intermediate sections of the body support are at an angle to each other.

In order to lower the foot section of the body support, the hinged door 76 is lowered to the dotted line position of Fig. 2, said door 76 carrying with it short sections of the supporting rails 24 as shown. By thus removing the supports for the rollers 23, the foot section of the body support is allowed to swing downwardly.

When the couch is used as an exercising device, the adjusting screws 50 may be loosened so that the springs 49 will not hold the locking pins 47 securely in the recesses 48 and then the handle bar may be used as an arm and chest developer, or for the reduction and strengthening of the abdomen in the manner indicated in Fig. 15. The adjustable friction straps 62 provide for imparting any desired resistance to the movement of the handle bar under the arrangement shown in Fig. 15. When the handle bar and arms are used as an exercising device, the stops 33 may be pushed toward the head of the couch thereby preventing any tilting action of the body support. When the couch is used for leg exercises, the position of the handle bar may be as shown in Figs. 12 and 16. By reason of the springs 61 resisting the turning movement of the handle bar 41, the latter may be used as a wrist developer. By inserting the feet under the strap 80 and inclining the body support as shown in Figs. 14 and 17 and locking said body support by means of the pins 72, body exercises such as are indicated in Fig. 17 may be performed at the will of the patient. By closing and fastening the door 75 the latter acts to prevent sliding movement of the body support, enabling certain exercises to be performed as indicated in Figs. 11 and 16.

When the apparatus as a whole is not in use for exercising purposes, there is little or nothing to distinguish the same from an ordinary box couch after all the parts are folded and inclosed as illustrated in Fig. 1.

What I claim is:—

1. The combination with a supporting frame, of a human body support normally disposed in a substantially horizontal plane and having a tilting relation to said frame and supported thereby, and operating means whereby the occupant while on said body support may tilt the latter.

2. The combination with a supporting frame, of a human body support having a normally horizontal but tilting relation to said frame and supported thereby, and means positioned beyond one end of the body support whereby the occupant may tilt the latter.

3. The combination with a supporting frame, of a human body support normally disposed in a substantially horizontal plane, and operating means whereby the occupant while reclining on said body support may slide and tilt the latter.

4. The combination with a supporting frame, of a human body support normally disposed in a substantially horizontal plane, said body support embodying a plurality of sections hinged together, one of said sections being adapted to automatically change its angle to the adjoining section as the latter is tilted.

5. The combination with a supporting frame, of a human body support normally disposed in a substantially horizontal plane, said body support embodying a plurality of sections hinged together, and means for automatically limiting the movement of one of the hinged sections in relation to the adjoining section.

6. The combination with a supporting frame, of a human body support normally disposed in a substantially horizontal plane, and laterally adjustable means to engage a part of the body and hold such part in fixed relation to the body support.

7. The combination with a supporting frame, of a human body support normally disposed in a substantially horizontal plane, operating means whereby the occupant while reclining on said body support may slide and tilt the latter, and means for automatically restoring the body support to its normal position when the occupant relaxes.

8. The combination with a supporting frame, of a human body support normally disposed in a substantially horizontal plane, adjustable limiting means for varying the extent of tilting movement of the body support, and operating means whereby the occupant while on said body support may tilt the latter.

9. The combination with a supporting frame, of a human body support normally disposed in a substantially horizontal plane, said body support embodying a plurality of sections hinged together in line with the knees of the occupant, adapting the feet supporting section to swing downwardly as the adjacent end of the adjoining section rises, and means at the hinge point for supporting the spring along a transverse line as the body section swings downwardly.

10. The combination with a supporting frame, of a human body support normally disposed in a substantially horizontal plane, and operating means whereby the occupant while reclining on said body support may slide and tilt the latter, said operating means embodying a handle bar adapted to be disposed beyond one end of the frame.

11. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, and jointed arms connecting said handle bar to the frame.

12. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, and jointed arms connecting said handle bar to the frame, and arranged to fold within the lines of said frame.

13. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, and jointed arms connecting said handle bar to the frame and each comprising a plurality of sections pivotally connected together.

14. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, jointed arms connecting said handle bar to the frame and each comprising a plurality of sections pivotally connected together, and latching means for holding said sections in fixed relation to each other when in line with or at an angle to each other.

15. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, jointed arms connecting said handle bar to the frame and each comprising a plurality of sections pivotally connected together, and latching means for holding said sections in fixed relation to each other when in line with or at an angle to each other, said latching means being operable by partially turning said handle bar.

16. The combination with a supporting frame, of a human body support normally disposed in a substantially horizontal plane, operating means whereby the occupant while reclining on said body support may slide and tilt the latter, said operating means embodying a handle bar adapted to be disposed beyond one end of the frame, jointed arms connecting said handle bar to the frame, said arms being pivotally attached to said frame, a friction brake for resisting the swinging movement of said arms, and means for adjusting the tension of said brake.

17. The combination with a supporting frame, of a human body support normally disposed in a substantially horizontal plane, operating means whereby the occupant while on said body support may incline the latter, and means for locking said body support under different inclinations thereof.

18. The combination with a supporting frame, of a tiltable human body support normally disposed in a substantially horizontal plane, and means controlled by the occupant for tilting said body support, said frame being closed on all sides forming a housing for the body support and the means for tilting the latter.

19. The combination with a supporting frame, of a human body support normally disposed in a substantially horizontal plane and slidable in the direction of its length, fulcrum hooks on said body support, and a cross rod with which said hooks engage when the body support reaches the limit of its outward sliding movement.

20. The combination with a supporting frame, of a human body support normally disposed in a substantially horizontal plane, and slidable in the direction of its length, fulcrum hooks on said body support, a cross rod with which said hooks engage when the body support reaches the limit of its outward sliding movement, and rollers supporting said body support.

21. The combination with a supporting frame, of a human body support normally disposed in a substantially horizontal plane and slidable in the direction of its length, fulcrum hooks on said body support, a cross rod with which said hooks engage when the body support reaches the limit of its outward sliding movement, and rollers supporting said body support and journaled on said cross rod.

22. The combination with a supporting frame, of a human body support normally disposed in a substantially horizontal plane and slidable in the direction of its length, means for locking said body support under different inclinations thereof, and adjustable stops for either permitting or preventing the body support from tilting when at the limit of its outward sliding movement.

23. The combination with a supporting frame, of a human body support slidable in the direction of its length, normally disposed in a substantially horizontal plane and adapted to be tilted, and a balance weight adjustable lengthwise of said body support.

24. The combination with a supporting frame, of a tilting human body support normally disposed in a substantially horizontal plane, and anti-friction means for supporting said body support in relation to the frame and permitting said body support to be moved in the direction of its length.

25. The combination with a supporting frame, of a human body support normally disposed in a substantially horizontal plane, said body support embodying a plurality of sections hinged together in line with the knees of the occupant, adapting the feet supporting section to swing downwardly as the adjacent end of the adjoining section rises, and limiting means for automatically arresting the movement of the feet supporting section when a predetermined angle is assumed thereby.

26. The combination with a supporting frame, of a human body support normally disposed in a substantially horizontal plane, said body support embodying a plurality of sections hinged together in line with the knees of the occupant, adapting the feet supporting section to swing downwardly as the adjacent end of the adjoining section rises, and means for causing the feet supporting section to automatically resume its alinement with the adjoining section when the body support is returned to its normal position.

27. The combination with a supporting frame, of a human body support normally disposed in a substantially horizontal plane, means whereby the occupant while on said body support may tilt the latter, and means for automatically restoring the body support to its normal position when the occupant relaxes.

28. The combination with a supporting frame, of a human body support normally disposed in a substantially horizontal plane, said body support embodying a plurality of sections hinged together, and means at the hinge point for closing the openings at the sides of the body support as one section changes its angular relation to the adjoining section.

29. The combination with a supporting frame, of a tilting human body support normally disposed in a substantially horizontal plane, operating means whereby the occupant while on said body support may tilt the latter, and retaining means located at one end of said body support to prevent the occupant from sliding therefrom when the latter is tilted at an angle.

30. The combination with a supporting frame, of a tilting human body support normally disposed in a substantially horizontal plane, operating means whereby the occupant while on said body support may tilt the latter, and feet holding means at one end of said body support to prevent the occupant from sliding therefrom when the latter is tilted at an angle.

31. The combination with a supporting frame, of a human body support slidable in the direction of its length, means whereby the occupant may slide the body support in one direction, and means for automatically returning said body support to its initial position when the occupant relaxes.

32. The combination with a supporting frame, of a human body support normally disposed in a substantially horizontal plane, a flexible body supporting element carried by said body support, said body support embodying a plurality of sections hinged together, and means at the hinge point for supporting said flexible body supporting element along a transverse line as one section changes its angle to the adjoining section.

33. The combination with a supporting frame, of a human body support normally disposed in a substantially horizontal plane, said body support embodying a plurality of sections hinged together, one of said sections being adapted to automatically change its angle to the adjoining section as the latter is tilted, and means to lock one of said sections in alinement with the adjoining section.

34. The combination with a supporting frame, of a human body support having a normally horizontal but tilting relation to said frame and supported thereby, said body support embodying a plurality of sections and means for locking one of said sections in a predetermined relation to the adjoining section, and means whereby the occupant may tilt the body support.

35. The combination with a supporting frame, of a human body support slidable in the direction of its length, and means for preventing said body support from sliding.

36. The combination of a human body support having a normally horizontal but tilting relation to said frame and supported thereby, and means at one end of the body support whereby the occupant may tilt the latter.

In testimony whereof I affix my signature in presence of two witnesses.

ROBERT S. BOLGER.

Witnesses:
BERNARD F. McCABE,
JESSE D. WALKER.